(12) United States Patent
Song et al.

(10) Patent No.: US 11,405,625 B2
(45) Date of Patent: Aug. 2, 2022

(54) METHOD FOR ALLOCATING AND SCHEDULING TASK FOR MAXIMIZING VIDEO QUALITY OF TRANSCODING SERVER USING HETEROGENEOUS PROCESSORS

(71) Applicant: INHA-INDUSTRY PARTNERSHIP INSTITUTE, Incheon (KR)

(72) Inventors: Minseok Song, Incheon (KR); Dayoung Lee, Incheon (KR)

(73) Assignee: INHA-INDUSTRY PARTNERSHIP INSTITUTE

( * ) Notice: Subject to any disclaimer, the term of this patent is extended or adjusted under 35 U.S.C. 154(b) by 0 days.

(21) Appl. No.: 16/943,354

(22) Filed: Jul. 30, 2020

(65) Prior Publication Data
US 2021/0329279 A1    Oct. 21, 2021

(30) Foreign Application Priority Data
Apr. 7, 2020    (KR) .................. 10-2020-0041918

(51) Int. Cl.
*H04N 19/40* (2014.01)
*H04N 19/59* (2014.01)
*H04N 21/2662* (2011.01)

(52) U.S. Cl.
CPC ............ *H04N 19/40* (2014.11); *H04N 19/59* (2014.11); *H04N 21/2662* (2013.01)

(58) Field of Classification Search
CPC ..... H04N 19/40; H04N 21/2662; H04N 19/59

USPC ..................................................... 375/240.12
See application file for complete search history.

(56) References Cited

U.S. PATENT DOCUMENTS

| 2005/0047503 | A1* | 3/2005 | Han | H04N 19/177 |
| | | | | 375/240.01 |
| 2015/0195328 | A1* | 7/2015 | Rehan | H04L 65/602 |
| | | | | 709/219 |
| 2021/0306641 | A1* | 9/2021 | Bae | H04N 19/61 |

FOREIGN PATENT DOCUMENTS

KR    20140058091 A    5/2014

OTHER PUBLICATIONS

Wei et al., "QoS-Aware Resource Allocation for Video Transcoding in Clouds," IEEE Transactions on Circuits and Systems for Video Technology, vol. 27, No. 1, Jan. 2017, 13 pages.

(Continued)

*Primary Examiner* — On S Mung
(74) *Attorney, Agent, or Firm* — Hoffman Warnick LLC (57) ABSTRACT

Disclosed is a method for assigning and scheduling a task for maximizing video quality of a transcoding server using heterogeneous processors. A method performed by a transcoding server configured with heterogeneous processors may include receiving a request for video transcoding for a video encoded based on a variable bitrate (VBR), predicting transcoding information for assigning a transcoding task in response to the received request for video transcoding, and determining information on a node to which a transcoding task is to be assigned and preset option information for the transcoding based on a result of the predicted transcoding information.

8 Claims, 6 Drawing Sheets

(56) References Cited

OTHER PUBLICATIONS

Kim et al., "Load Distribution Method based on Transcoding Time Estimation on Distributed Transcoding Environments," IP:152.99.203, 2010, 10 pages.

Lee et al., "Video Quality Adaptation for Limiting Transcoding Energy Consumption in Video Servers," IEEE Access, Multidisciplinary, Rapid Review, Open Access Journal, Creative Commons Attribution 4.0 License, vol. 7, Sep. 2, 2019, 12 pages.

Dayoung Lee et al., "Design and Implementation of Low-Power Transcoding Servers Based on Transcoding Task Distribution," IP 152.99.203.161, 2019, 12 pages.

\* cited by examiner

1: Temporary variables: $\forall i, (i =,...,N^{task}), X_i^{temp}$ and $Y_i^{temp}$;
2: Array of all the values of $U_{i,j,k}$: A;
3: for i = 1 to $N^{task}$ do
4:     $X_i^{temp} \leftarrow X_i^{low}$ ;
5:     $Y_i^{temp} \leftarrow Y_i^{low}$ ;
6: end for
7: while $A \neq \emptyset$ do
8:     Choose the highest value of $U_{I^{task}, I^{node}, I^{para}}$ from A;
9:     if $G_{I^{task}, X_{I^{task}}^{temp}, Y_{I^{task}}^{temp}} < G_{I^{task}, I^{node}, I^{para}}$ then
10:         if $\forall T_i \in A_{I^{node}}, \sum \forall T_m \in L_{i, I^{node}} T_m, X_m, Y_m \leq D_m$ then
11:             $X_{I^{task}}^{temp} \leftarrow I^{node}$ ;
12:             $Y_{I^{task}}^{temp} \leftarrow I^{para}$ ;
13:         end if
14:     end if
15:     Removes $U_{I^{task}, I^{node}, I^{para}}$ from A
16: end while
17: for i = 1 to $N^{task}$ do
18:     $X_i \leftarrow X_i^{temp}$ ;
19:     $Y_i \leftarrow Y_i^{temp}$ ;
20: end for

(1) HRP (2) MRP (3) LRP

FIG. 6

(1) HRP (2) MRP (3) LRP

METHOD FOR ALLOCATING AND SCHEDULING TASK FOR MAXIMIZING VIDEO QUALITY OF TRANSCODING SERVER USING HETEROGENEOUS PROCESSORS

CROSS REFERENCE TO RELATED APPLICATION

This application claims priority under 35 U.S.C. § 119 to Korean Patent Application No. 10-2020-0041918 filed on Apr. 7, 2020, which is incorporated herein by reference in its entirety.

BACKGROUND OF THE INVENTION

1. Technical Field

The following description relates to a task allocation and scheduling technology for maximizing video quality.

2. Description of the Related Art

Dynamically adaptive streaming over the HTTP (DASH) has now become a defacto standard for Internet video streaming because many streaming service providers, including Hulu, YouTube and Netflix, have adopted the DASH. In the DASH, each video is split into segments which are further encoded into versions having several bitrates. This allows a client-side media player to choose a version having a proper bitrate that matches a current network condition in order to minimize playback stalls.

Transcoding is essential in producing versions having various bitrates in DASH. For example, it has been reported that in Netflix streaming, a single video clip may require 120 transcoding tasks. However, transcoding is computationally intensive, and has a negative effect on server scalability because it requires significant processing infrastructure. Accordingly, a server for transcoding is configured with heterogeneous CPUs and GPUs because a calculation unit needs to be gradually added in order to effectively support an increasing demand for transcoding. Each processing unit has different characteristics in terms of video quality, transcoding speed and costs, and needs to be incorporated into the assignment of transcoding tasks.

Internet video streaming naturally increases the amount of Internet video traffic and requires a large-scale server structure. For example, it is estimated that YouTube provides 40-million moving images daily. This corresponds to data of 200 TB. Accordingly, a large-scale transcoding server is necessary and effective handling thereof is important.

Streaming companies, such as Netflix, have started to adopt a variable bitrate (VBR) technique, which reduces network bandwidths and also provides better quality of experience (QoE) compared to the constant-bit-rate (CBR) technique. However, today research of a DASH technique using the VBR is insignificant.

In general, in video codec, various preset options for solving the tradeoff between a transcoding time, video quality and a compression ratio are provided. For example, H.264 codec provides 9 preset options (ultrafast, superfast, veryfast, faster, fast, medium, slow, slower, and veryslow) in the CPU. In order to provide better video quality per bitrate, a high-quality preset option should be chosen, but a transcoding time is increased. For example, the veryslow preset option provides the highest video quality per bitrate, but has a problem in that the transcoding time is long. Accordingly, it is important to select a preset option capable of solving the tradeoff.

In order to provide fast streaming after uploading, some tasks need to be transcoded as soon as possible. Transcoding of some videos may be delayed because the videos are unpopular, but some tasks need to be transcoded as soon as possible in order to increase a service level agreement (SLA). Accordingly, proper scheduling needs to be performed in order to guarantee the deadline of each task.

In summary, in a VBR-based transcoding server, there is a need for the development of a scheme for predicting a transcoding time upon transcoding based on each preset and processor type, video quality of transcoding output, and a bitrate, and a processor and a preset assignment and scheduling scheme based on the interest and deadline of a transcoding task.

The management of a transcoding task in the DASH system has been continuously researched, but there is no technique for selecting a transcoding preset option and transcoding videos at the VBR within a deadline in a transcoding server configured with heterogeneous processors. The development of the corresponding technique is essential in a situation in which a VBR-based streaming server has started to be used and timing at which a GPU and a CPU are mixed and used.

SUMMARY OF THE INVENTION

Embodiments may provide a method and apparatus for maximizing video quality per bitrate in order to reduce a network bandwidth and also provide better video quality, while satisfying a transcoding deadline, in a server for transcoding a video encoded by a variable bitrate (VBR) technique. To this end, embodiments may provide a new technique developed to predict a transcoding time and video quality per bitrate through multi-regression analysis and a new technique for determining a processor node to which a task will be assigned and a preset option for transcoding based on predicted results.

A method performed by a transcoding server configured with heterogeneous processors may include receiving a request for video transcoding for a video encoded based on a variable bitrate (VBR), predicting transcoding information for assigning a transcoding task in response to the received request for video transcoding, and determining information on a node to which a transcoding task is to be assigned and preset option information for the transcoding based on a result of the predicted transcoding information.

Predicting the transcoding information may include predicting each preset option and a bitrate and video quality of each resolution in each processor node based on the VBR of each of segments of the video with respect to original data of the video, and sequentially predicting a transcoding time of each resolution.

Predicting the transcoding information may include deriving the relation between the resolution, the bitrate, and the video quality and the relation between the resolution and transcoding time based on the bitrate of the original data of the video by applying multi-regression analysis.

Determining the information on the node and the preset option information may include determining a processor node, including any one processor type of a GPU or a CPU to which a transcoding task is to be assigned, and preset option information for the transcoding, based on each preset option included in the results of the predicted transcoding information and the bitrate, video quality and transcoding time of a resolution in each processor node.

Determining the information on the node and the preset option information may include selecting a node and preset option indicative of a minimum transcoding time.

Determining the information on the node and the preset option information may include redistributing a workload to a processor node determined to maximize video quality per bitrate while minimizing a transcoding increase time.

Determining the information on the node and the preset option information may include obtaining a utility value when an i (i is a natural number)-th task is executed based on a specific preset in a j (j is a natural number) node and performing the workload redistribution based on a utility value of a preset reference or more from the obtained utility value.

A transcoding server configured with heterogeneous processors may include a transcoding request receiver configured to receive a request for video transcoding for a video encoded based on a variable bitrate (VBR), a transcoding information prediction unit configured to predict transcoding information for assigning a transcoding task in response to the received request for video transcoding, and a determination unit configured to determine information on a node to which a transcoding task is to be assigned and preset option information for the transcoding based on a result of the predicted transcoding information.

DETAILED DESCRIPTION

Hereinafter, embodiments are described with reference to the accompanying drawings.

In an embodiment, a new scheme for maximizing video quality per bitrate while satisfying the execution deadline of each transcoding task in a video transcoding server configured with heterogeneous CPUs and GPUs is described.

In order to maximize video quality per bitrate, a video quality value based on a preset option and the type of processor, and a transcoding time should be accurately predicted. To this end, in an embodiment, a method and apparatus for accurately deriving a preset parameter, and predicted values of a transcoding time, video quality and a bitrate based on the type of processor through multiple regressions using an actual video clip encoded by a variable bitrate (VBR) technique is described.

Specifically, a new scheme for maximizing video quality per bitrate based on a predicted video quality value and transcoding time is proposed. A scheme proposed in an embodiment may be used to define a utility value for selecting each processor node and preset option and to gradually redistribute a workload in order to maximize total video quality per bitrate based on the utility value. In the following description, it can be seen that a regression equation is accurately predicted and video quality per bitrate is maximized while satisfying the deadline of all of transcoding tasks.

Figure 1:
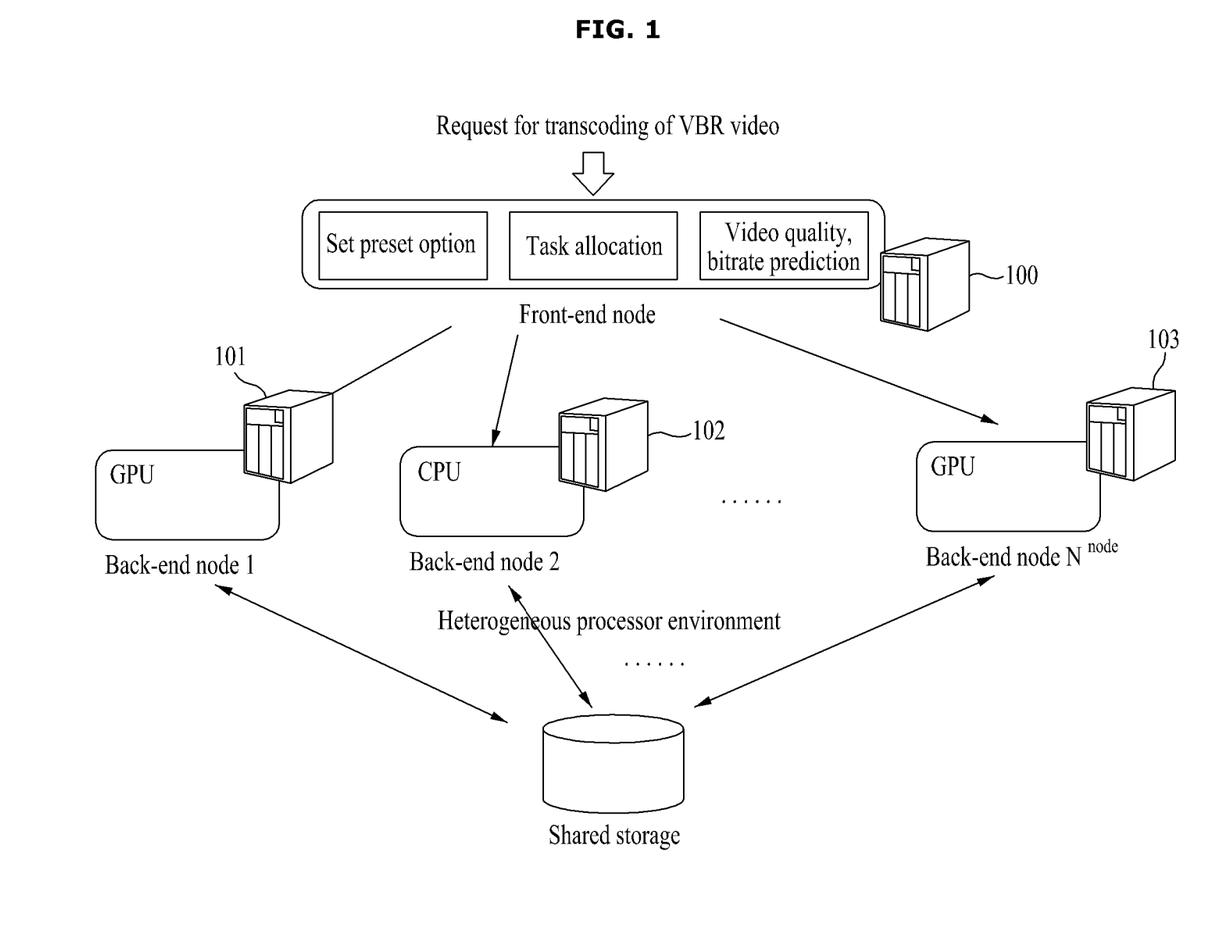
FIG. 1 is a diagram for describing a schematic operation of a transcoding server according to an embodiment.

FIG. 1 is a diagram for describing a schematic operation of a transcoding server according to an embodiment.

The transcoding server is configured with different types of $N^{node}$ nodes. Each of the nodes is a CPU or GPU node. A transcoding task may be assigned to each node. The number of all tasks is denoted $N^{task}$. $\tau_i$ is denoted as an i-th task. A deadline-initial value of $\tau_i$ is $D_i^A$. The deadline of a task is relative and thus reduced over time. The deadline of $\tau_i$ in a current time "cur" during which an algorithm is performed is called $D_i^R$, wherein $D_i^R = D_i^A$-cur.

In DASH, a video is split into segments. The segments may be transcoded into several resolution versions having different video quality. In this case, each node has a different number of preset options depending on the type of processor and a codec used in the processor. $N_j^{pare}$ (j=1, ..., $N^{node}$) is the number of preset options of a node j. Most of codecs for transcoding may provide a collection of preset options for generating various transcoding speeds, video quality and compression ratios.

The time taken for a task $\tau_i$ to be executed and generated based on a preset k in a node j is called $T_{i,j,k}$, the bitrate of a transcoded version is called $B_{i,j,k}$, and a video quality index is called $Q_{i,j,k}$. In an embodiment, video quality may be represented using an SSIM index. It is assumed that the preset options are sorted in ascending order of $Q_{i,j,k}$ values.

When transcoding is completed, a video clip may be streamed to a user. The popularity of video streaming may be divided into three steps. For example, the popularity of video streaming may be divided into a hot step when the video streaming is first released, a warm step in a middle level, and a cold step when a video is not exposed. A total of access numbers for such popularity of video may be predicted using a machine learning technique. An access number of $\tau_i$ is defined as $N_i^{acces}$.

Assuming that video quality per bitrate of a transcoded version generated as the task $\tau_i$ is executed as the preset k at the node j by considering video popularity is called $G_{i,j,k}$, $$G_{i,j,k} = \frac{Q_{i,j,k} N_i^{access}}{B_{i,j,k}}.$$

Each node may use EDF scheduling in which $D_i^R$ first transcodes the lowest task $\tau_i$. Accordingly, $A_j$, that is, a list of tasks assigned to the node j, may be sorted in ascending order of $D_i^R$ values. $L_{i,j}$ means a list of tasks having earlier deadlines than the task $\tau_i$ when the task $\tau_i$ is assigned to the node j. In order to satisfy the deadlines of all the tasks assigned to the node j according to the Jackson's theorem, $$\forall \tau_i \in A_j, \sum_{\forall \tau_m \in L_{i,j}} T_m \cdot X_m \cdot Y_m \leq D_m$$

should be satisfied.

In an embodiment, in order to satisfy the deadline while maximizing a total video quality per bitrate $$\sum_{N=1}^{N^{node}} G_i, X_i, Y_i,$$

a method of selecting a node $X_i$ to which each task $\tau_i$ (i=1, ..., $N^{task}$) will be assigned and a preset $Y_i$ is described. A problem in that the node $X_i$ to which each task $\tau_i$ (i=1, ..., $N^{task}$) will be assigned and the preset $Y_i$ are selected in order to satisfy the deadline while maximizing the total video quality per bitrate $$\sum_{i=1}^{N^{task}} G_i, X_i, Y_i$$

may be represented as follows.

$$\text{Maximize} \sum_{i=1}^{N^{task}} G_{i,X_i,Y_i}$$

$$\text{subject to } \forall_{\tau_i} \in A_{j,\sim \tau_m} \sum_{\in L_{i,j}} T_{m,X_m,Y_m} \leq D_m$$

$$j = 1, \dots, N^{node}$$

In an embodiment, in order to solve the problem, a heuristic-based algorithm for deriving an equation for predicting parameters of an algorithm, such as a transcoding time, video quality and a bitrate, through multiple regressions and approaching to an optimal value is proposed.

The transcoding server may predict parameters through multiple regressions. The transcoding server may predict the parameters, including a transcoding time, video quality and a bitrate. Each segment may be transcoded using the VBR scheme. Each preset option has a different compression rate. Accordingly, although preset options have the same version, they have different bitrates if they have different segments. Accordingly, in order to efficiently distribute transcoding tasks to processors, parameters, such as a bitrate, video quality and a transcoding time, need to be predicted. In an embodiment, the transcoding server may measure a bitrate, SSIM and a transcoding time for a plurality of video segments having preset lengths for each of a plurality of resolutions in order to predict the bitrate, video quality and transcoding time. Furthermore, the frame rate of a sample and a bit per pixel may also be set as preset values. For example, a bitrate, an SSIM value and a transcoding time for 3000 video segments (each 6-second length) having transcoded resolutions of 240p, 360p, 480p and 720p. The frame rate of the sample may be set as 30 fps, and the bit per pixel (bpp) may be set as 0.15. Furthermore, nodes with various versions of CPUs and GPUs may be considered. For example, nodes with two types of Intel i79700 CPU and NVIDIA GTX2070 GPU may be considered. In this case, H264 codec is used in the CPU. Each segment may be transcoded using a plurality of (e.g., 9) preset options (ultrafast, superfast, veryfast, faster, fast, medium, slow, slower, and veryslow) of the codec. The GPU performs decoding through H264_CUVID codec and encoding through H264_NVENC codec. Each segment may be transcoded using a plurality of (e.g., 4) presets (LLHP, HP, LLHQ, and HQ) of the codec. A processor node may generate a plurality of (e.g., 4) transcoded versions by executing a plurality of (e.g., 52) transcoding tasks per segment. A total of 156,000 transcoding tasks are necessary for regression analysis. Such a transcoding task may be automated as a script.

A dummy parameter indicative of a resolution $V_l$ (l=1, ..., $N_r$) for multiple regressions is described. In this case, $N_r$ is a total number of transcoded resolutions as follows.

$$V_i = \begin{cases} 1 = & \text{Selected resolution index is } l \\ 0 = & \text{Otherwise.} \end{cases}$$

It is assumed that the resolution of the original video is 1080p and four transcoded resolutions 240p, 360p, 480p and 720p are present. $N_r$ is 4, and $(V_1, V_2, V_3, V_4) = (0, 0, 0, 1)$ are dummy parameters indicative of the resolution 720p. Only the value of a bitrate (kbps) $H_1$ for the highest resolution (or the original resolution) of a requested video segment has been known prior to transcoding.

The transcoding server may predict the bitrates and video quality of all resolutions in each preset option and each processor node based on only the value of the bitrate $H_1$ for the highest resolution (or the original resolution), and may sequentially predict the transcoding time of all of the resolutions. To this end, multi-regression analysis is applied. The relation between the resolution, the bitrate and the video quality, and the relation between the resolution and the transcoding time may be derived based on only the bitrate of the original video having the highest resolution.

The transcoding server may predict the bitrate and video quality (SSIM). The transcoding server may use information indicating that the bitrate of the original version (1080p) and an SSIM value of the original version are 1 prior to transcoding. In order to obtain the bitrate of a resolution l, the transcoding server may derive the bitrate and video quality of a lower transcoded version resolution using the bitrate and SSIM value of a resolution l+1 according to a multi-regression technique. Assuming that the resolution of a segment transcoded by a task $\tau_i$ in a node j and a preset k is l, $B_{i,j,k}^{up}$ indicates the bitrate of the resolution l+1 of the corresponding video segment, and $Q_{i,j,k}^{up}$ indicates an SSIM value of the resolution l+1 of the corresponding video segment.

The bitrate of results transcoded by the task $\tau_i$ in the node j and the preset k follow the following equation. A value $\alpha_{j,k}^1 \sim \alpha_{j,k}^{N_r+3}$ is the parameter of a regression equation.

$$B_{i,j,k} = \exp(\alpha_{j,k}^1 + \alpha_{j,k}^2 \ln B_{i,j,k}^{up} + \alpha_{j,k}^3 Q_{i,j,k}^{up} + \alpha_{j,k}^4 V_1 + \dots + \alpha_{j,k}^{N_r+3} V_{N_r})$$

The transcoding server may predict a CPU transcoding time. The transcoding server may set multi-regression equation for deriving a CPU transcoding time from each resolution, obtained through the bitrate and video quality (SSIM), using a bitrate and an SSIM value. Accordingly, the set multi-regression equation may be represented as follows. A value $\gamma_{j,k}^1 \sim \gamma_{j,k}^{N_r+3}$ is the parameter of the regression equation.

$$T_{i,j,k} = \gamma_{j,k}^1 + \gamma_{j,k}^2 \ln H_i + \gamma_{j,k}^3 \ln B_{i,j,k} + \gamma_{j,k}^4 Q_{i,j,k} + \gamma_{j,k}^5 V_1 + \dots + \gamma_{j,k}^{N_r+4} V_{N_r}$$

The transcoding server may predict a GPU transcoding time. According to regression analysis, the relation between a bitrate, SSIM, a resolution and a GPU transcoding time is weakly correlated. For example, a coefficient of determination R for all preset options is smaller than 0.586. Accordingly, an average GPU transcoding time may be used as a parameter value.

Figure 2:
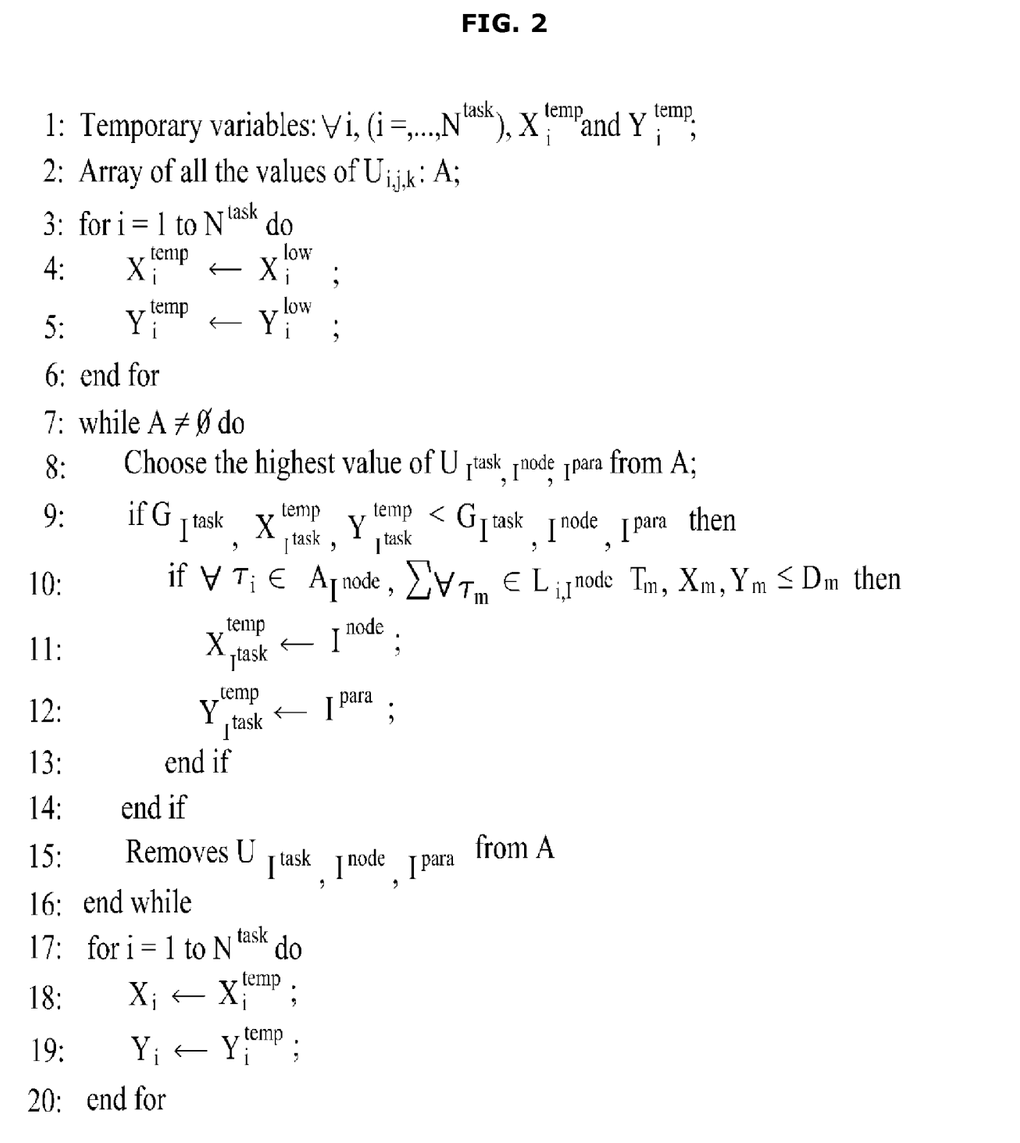
FIG. 2 illustrates pseudocodes of an algorithm for task assignment and scheduling for maximizing video quality in the transcoding server according to an embodiment.

FIG. 2 illustrates pseudocodes of an algorithm for task assignment and scheduling for maximizing video quality in the transcoding server according to an embodiment.

The transcoding server may determine a processor node to which a transcoding task is assigned and a preset option for transcoding. The transcoding server may perform two steps including an initialization step and a workload redistribution step. In the initialization step, the transcoding server may select a node and preset option indicative of a minimum transcoding time. In the redistribution step, the transcoding server may redistribute workloads in a way to maximize video quality per bitrate while minimizing a transcoding increase time.

The initialization step is described below in detail. $X_i^{temp}$ and $Y_i^{temp}$ are values in which temporary values of $X_i$ and $Y_i$ are stored, respectively. All of the values $X_i^{temp}$ and $Y_i^{temp}$ may be initialized as a node $X_i^{low}$ and a preset $Y_i^{low}$ composed of the lowest transcoding. For example, all presets may be assigned to a CPU node based on the ultrafast option. This method has the fastest transcoding time compared to all of presets of all processors (including a GPU), but may have very low video quality.

The workload redistribution step is described in detail. Values $X_i^{temp}$ and $Y_i^{temp}$ may be changed into values for maximizing $$\sum_{i=1}^{N^{task}} G_{i,X_i,Y_i}.$$

A utility value $U_{i,j,k}$ (i=1, . . . , $N^{task}$)(j=1, . . . , $N^{node}$) (ki=1, . . . , $N_j^{para}$) when a task $\tau_i$ is executed based on a preset k in a node j may be defined. In this case, a case where (j, k) of $U_{i,j,k}$ is ($X_i^{low}$, $Y_i^{low}$) is excluded. $U_{i,j,k}$ may be represented as follows.

$$U_{i,j,k} = \frac{G_{i,j,k} - G_{i,X_i^{low},Y_i^{low}}}{T_{i,X_i^{low},Y_i^{low}}^{slack} - T_{i,j,k}^{slack}}$$

In the value $U_{i,j,k}$ the numerator indicates an increase of video quality per bitrate and the denominator indicates a decrease of an extra deadline compared to a case where (j, k) is ($X_i^{low}$, $Y_i^{low}$). In other words, the transcoding server may prefer the selection of a higher value $U_{i,j,k}$ and perform a workload redistribution in order to select the direction in which video quality per bitrate is maximized while minimizing a transcoding increase time.

The workload redistribution step has an object of increasing total video quality. To this end, all of generated utility values $U_{i,j,k}$ are stored in a set A. The transcoding server may select the highest values $$U_{jtask,jnode,jpara}$$

from the set A, and may check whether the following condition is satisfied.

$$G_{jtask,X_{jtest}^{temp},Y_{jtest}^{temp}} < G_{jtask,jnode,jpara}$$

When the condition is satisfied, in order to satisfy the deadlines of tasks assigned to the node j according to the Jackson's theorem, the transcoding server may check whether $$\forall \tau_i \in A_{j,\forall \tau_m} \sum_{\in L_{i,j}} T_{m,X_m,Y_m} \le D_m$$

is satisfied, and may then update $X_{jnode}^{temp}$ and $Y_{jnode}^{temp}$ with $I^{node}$ and $I^{para}$, respectively. Thereafter, the transcoding server may delete the highest values $$U_{jtask,jnode,jpara}$$

from the set A, and may repeatedly select the highest value $$U_{jtask,jnode,jpara}$$

in the set A until the set A is empty. When the set A is fully empty, the values of $X_i$ and $Y_i$ may be updated as $X_i^{temp}$ and $Y_i^{temp}$, respectively.

Figure 3:
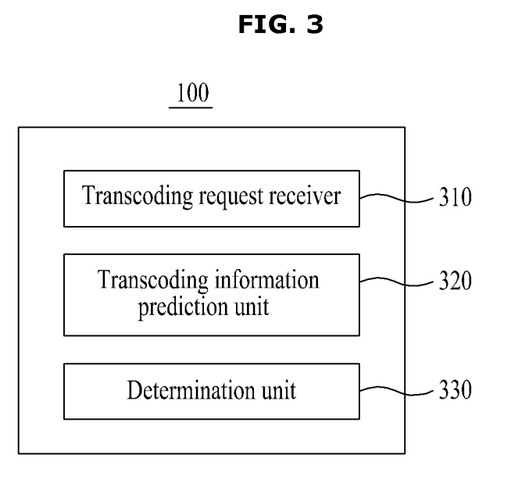
FIG. 3 is a block diagram for describing a configuration of the transcoding server according to an embodiment.

FIG. 3 is a block diagram for describing a configuration of the transcoding server 100 according to an embodiment.

Figure 4:
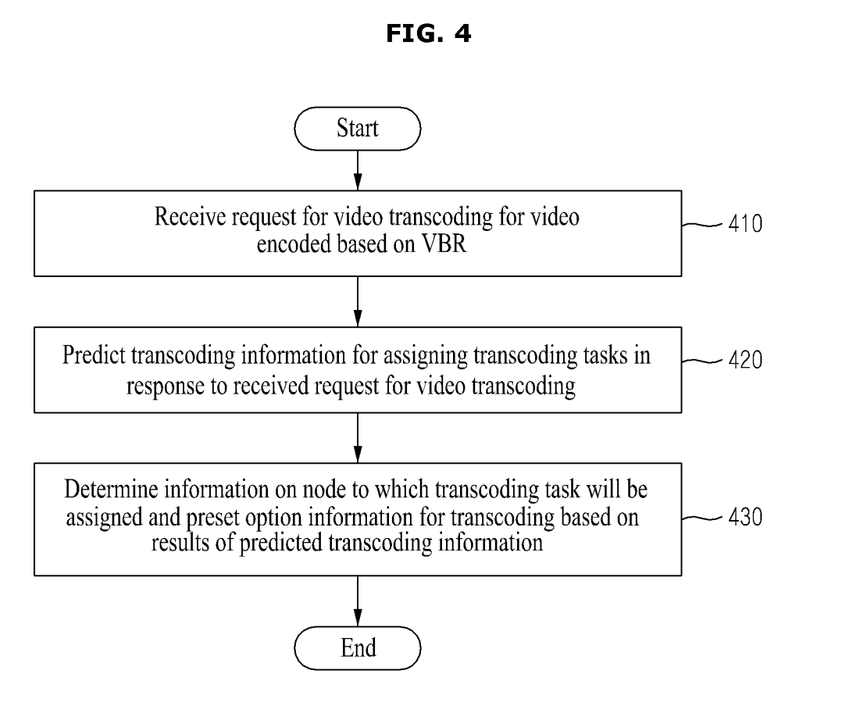
FIG. 4 is a flowchart for describing a method of performing task assignment and scheduling for maximizing video quality in the transcoding server according to an embodiment.

FIG. 4 is a flowchart for describing a method of performing task assignment and scheduling for maximizing video quality in the transcoding server 100 according to an embodiment.

A processor included in the transcoding server 100 may include a transcoding request receiver 310, a transcoding information prediction unit 320 and a determination unit 330. The processor and such elements of the processor may control the transcoding server to perform steps 410 to 430 included in the method of performing task assignment and scheduling for maximizing video quality, which is illustrated in FIG. 4. In this case, the processor and the elements of the processor may be implemented to execute instructions based on the code of an operating system and a code of at least one program included in a memory. In this case, the elements of the processor may be representations having different functions performed by the processor based on control instructions provided by a program code stored in the transcoding server 100.

The processor may load, onto the memory, a program code stored in a file of a program for the method of performing task assignment and scheduling for maximizing video quality. For example, when the program is executed in the transcoding server 100, the processor may control the transcoding server to load the program code from the file of the program to the memory under the control of the operating system.

At step 410, the transcoding request receiver 310 may receive a request for video transcoding for a video encoded based on the VBR.

At step 420, the transcoding information prediction unit 320 may predict transcoding information for assigning a transcoding task in response to the received request for video transcoding. The transcoding information prediction unit 320 may predict the bitrate and video quality of each resolution for each of the segments of the video in each preset option and each processor node using the VBR of the original data of the video, and may sequentially predict the transcoding time of each resolution. The transcoding information prediction unit 320 may derive the relation between the resolution, the bitrate and the video quality and the relation between the resolution and the transcoding time through the bitrate of the original data of the video by applying multi-regression analysis.

At step 430, the determination unit 330 may determine information on a node to which a transcoding task will be assigned and preset option information for transcoding based on the results of the predicted transcoding information. The determination unit 330 may determine a processor node, including any one processor type of a GPU or a CPU to which the transcoding task will be assigned and the preset option information for the transcoding based on the bitrate, video quality and transcoding time of the resolution in each preset option and each processor node included in the results of the predicted transcoding information. The determination unit 330 may select a node and preset option indicative of a minimum transcoding time. The determination unit 330 may redistribute a workload to the determined processor node in order to maximize video quality per bitrate while minimizing a transcoding increase time. The determination unit 330 may obtain a utility value when an i (i is a natural number)-th task is performed in a j (j is a natural number) node based on a specific preset, and may perform the workload redistribution using a utility value having a preset reference or more from the obtained utility value.

Figure 5:
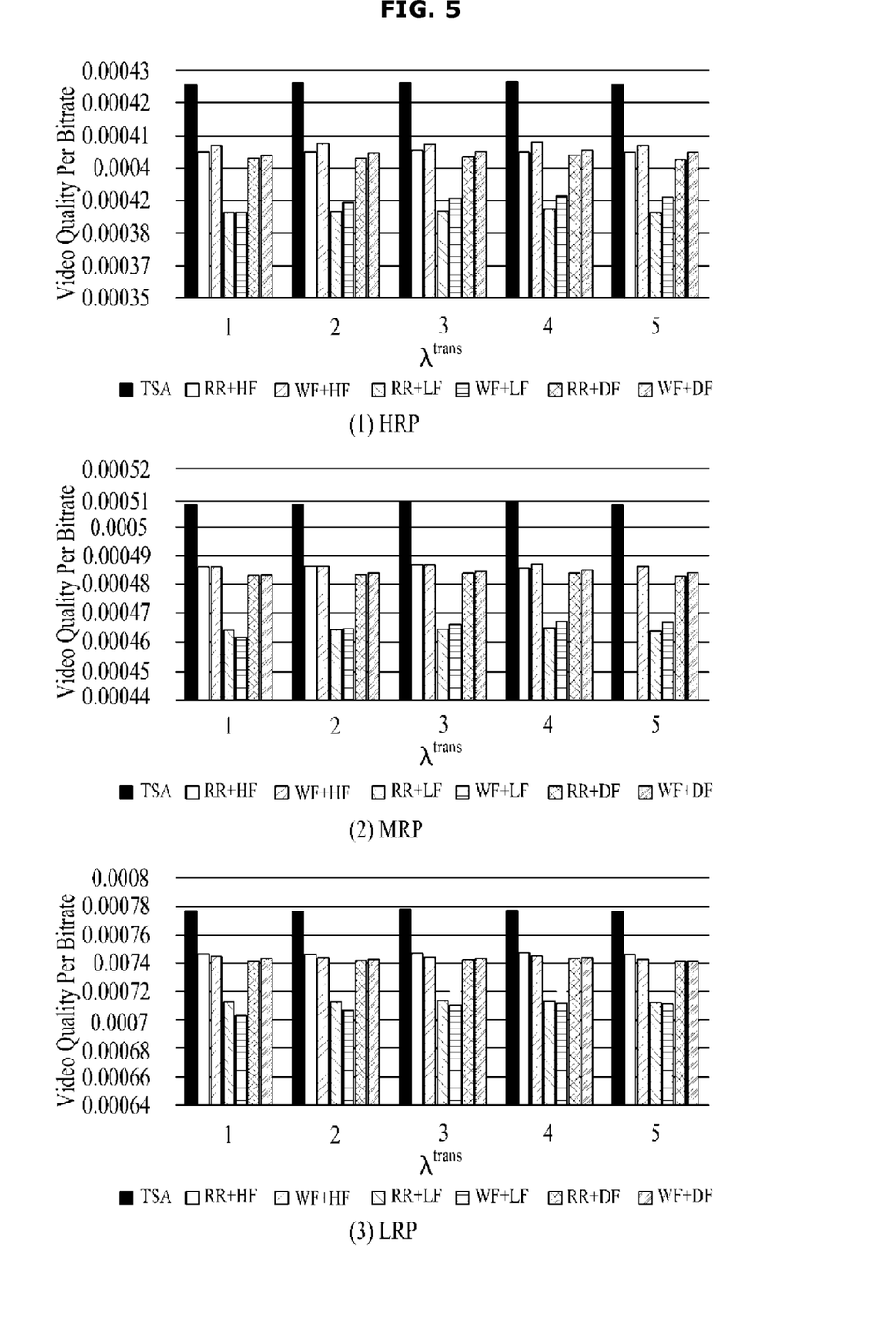
FIG. 5 is a graph for describing the results of a comparison between bitrates per video quality based on the rate at which transcoding requests arrive in a proposed method and another task assignment scheme in the transcoding server according to an embodiment.
Figure 6:
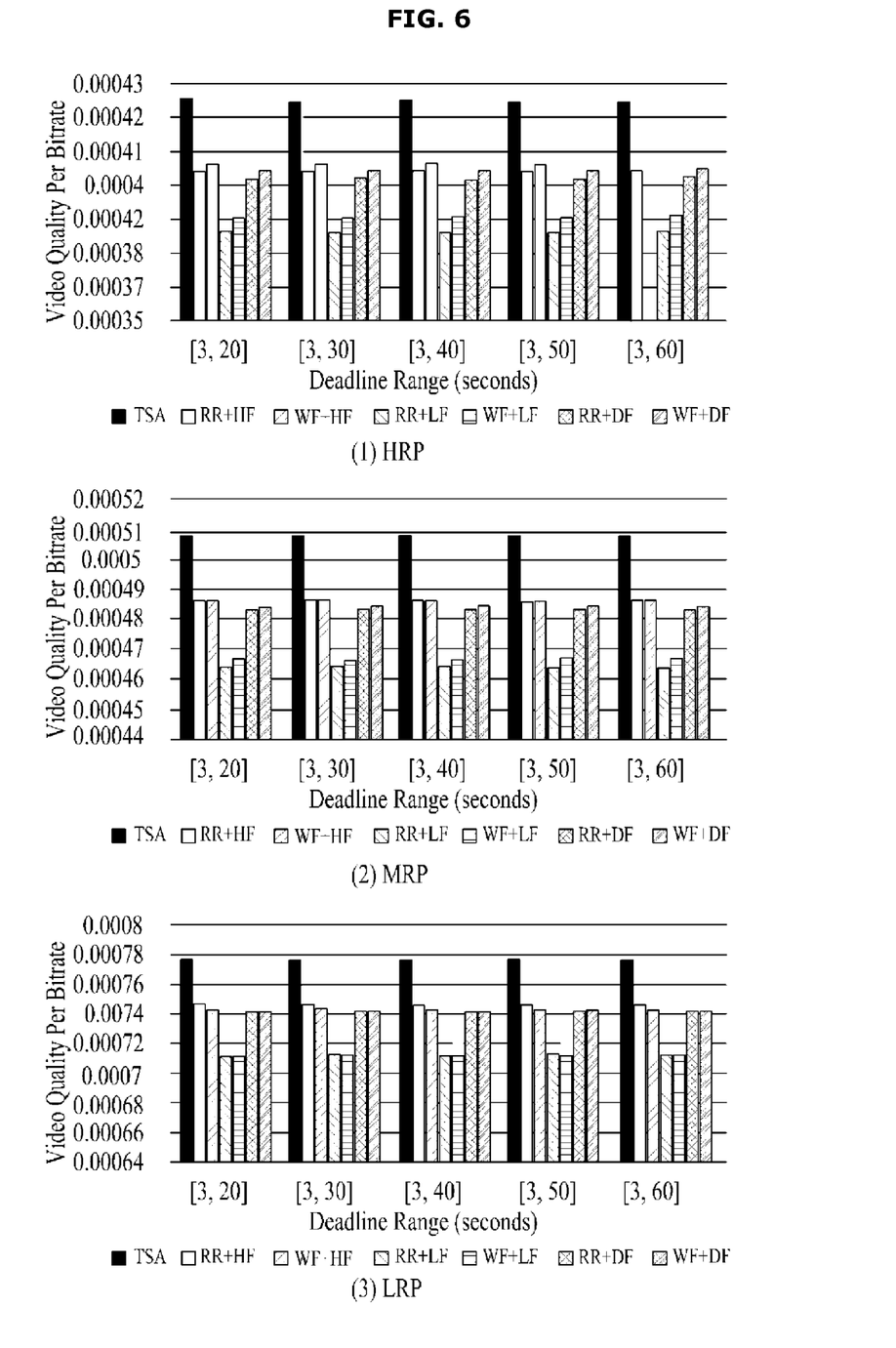
FIG. 6 is a graph for describing the results of a comparison between bitrates per video quality based on a deadline range in a proposed method and another task assignment scheme in the transcoding server according to an embodiment.

FIG. 5 is a graph for describing the results of a comparison between bitrates per video quality based on the rate at which transcoding requests arrive in a proposed method and another task assignment scheme in the transcoding server according to an embodiment. FIG. 6 is a graph for describing the results of a comparison between bitrates per video quality based on a deadline range in a proposed method and another task assignment scheme in the transcoding server according to an embodiment.

Transcoding support currently has met the limit due to a heavy increase of the demands for transcoding servers attributable to social streaming and personal broadcasting activation, such as Youtube and Twitch. For example, it is difficult for Twitch to support the transcoding of many video although it aggressively extended its servers. Furthermore, many streaming companies, such as Netflix, has introduced the VBR encoding scheme and started to mix and use GPUs and CPUs. Despite such a background, the transcoding server configured with heterogeneous processors according to an embodiment may select a transcoding preset option and perform transcoding on video at the VBR within a deadline.

In order to evaluate effects according to an operation of the transcoding server configured with the heterogeneous processors according to an embodiment, after the accuracy of regression analysis of a transcoding time and video quality per bitrate is analyzed using an actual video set, the number of transcoding requests per second, the number of deadline misses for checking an influence attributable to the setting of a deadline range, and streamed video quality may be measured through simulations.

The accuracy of regression analysis may be derived. In order to check the accuracy of a derived regression equation, a plurality of (e.g., 1000) different video segments not used to derive the regression equation may be transcoded into four different resolution versions (e.g., 240p, 360p, 480p and 720p) with a specific resolution (e.g., 1080p), and an SSIM value, a transcoding time and a bitrate may be measured. A mean absolute percentage error (MAPE) value between an actual value and a predicted value obtained through regressions may be calculated. This method is one of prediction accuracy measurement methods that are most widely used due to advantages of scale independency and interpretation. When the MAPE value is smaller than 10, it is considered as being very accurate prediction. When the MAPE value is smaller than 20, it is considered as being good prediction.

Table 1 is a summary of all MAPE values. As described above, preset options are sorted in ascending order of video quality values which may be obtained through presets. It can be seen that transcoding times, bitrates, and video quality have been very accurately predicted.

TABLE 1

| | MAPE values in preset options | | | | | | | | |
|---|---|---|---|---|---|---|---|---|---|
| Preset | 1 | 2 | 3 | 4 | 5 | 6 | 7 | 8 | 9 |
| CPU $B_{i,j,k}$ | 6.593 | 4.245 | 5.451 | 5.432 | 5.216 | 5.321 | 5.456 | 5.399 | 5.609 |
| GPU $B_{i,j,k}$ | 10.878 | 10.615 | 11.072 | 10.236 | — | — | — | — | — |
| CPU $Q_{i,j,k}$ | 2.016 | 1.52 | 1.399 | 1.366 | 1.349 | 1.343 | 1.336 | 1.316 | 1.312 |
| GPU $Q_{i,j,k}$ | 1.658 | 1.628 | 1.627 | 1.607 | — | — | — | — | — |
| CPU $T_{i,j,k}$ | 3.548 | 3.871 | 4.383 | 5.393 | 5.872 | 6.144 | 6.504 | 9.674 | 14.727 |

The results of the execution of simulations may be derived. In order to examine the influence of a proposed invention for the final video quality per bitrate and deadline miss ratios, simulations may be performed. In order to examine video quality, a plurality of (e.g., 100) versions per second may be streamed and derived for a preset time (e.g., 24 hours) after transcoding is terminated.

A simulation environment may be configured as follows.

Bitrate information of the original video: the bitrate of a 1080p video clip may be randomly generated using an average bitrate and standard deviation of 3,000 actual video segments of 1080p used for regressions because the bitrate of the VBR regression analysis follows a normal distribution. The length of each clip is between 1 minute and 1 hour, and the length of each segment may be set to 6 seconds.

Popularity setting: In general, video popularity follows a Zipf distribution. The popularity of each video clip may be set to θ=0.271. Furthermore, since video watching may be half-way stopped, the popularity of segments of each video also follows a Zipf distribution of θ=0.2. This means that a previous segment has higher popularity.

$P_l$ is defined as the popularity of resolution l (l=1, . . . , $N_r$). In this case, three types of combinations of ($P_1$, $P_2$, $P_3$, $P_4$, $P_5$), that is, the popularity of 240p, 360p, 480p, 720p, and 1080p, were considered. The three combinations are called "high resolutions are popular (HRP)", "medium resolutions are popular (MRP)", and "high resolutions are popular (LRP)", respectively. The popularities of the three combinations are as follows.

HRP:$(P_1,P_2,P_3,P_4,P_5)$=(0.1,0.1,0.2,0.3,0.3)

MRP:$(P_2,P_3,P_4,P_5)$=(0.1,0.25,0.3,0.25,0.1)

LRP:$(P_2,P_3,P_4,P_5)$=(0.3,0.3,0.2,0.1,0.1).

$N_i^{access}$ of each task $\tau_i$ may be derived based on the above settings.

Transcoding environment: it is assumed that the number of transcoding requests follows a Poisson distribution in which an average request per second is set as $\lambda^{trans}$. The transcoding requests may be performed for a total of 24 hours. The assignment of each task and the selection of a preset may be periodically performed every second. It is assumed that $N^{node}$ is 10 and Intel i79700 CPU and NVIDIA GTX2070 GPU are used.

Other Schemes for a comparison: in order to check effects of the method proposed in an embodiment, the transcoding results may be compared with a combination of each task assignment method and each preset option selection method. In this case, the task assignment method includes two types of round-robin (RR) and worst-fit (WF) methods.

The RR method is a method of assigning each task to a node in a round-robin manner. In other words, a task $\tau_i$ may be assigned to i % $N^{node}$ (when i % $N^{node}$=0, a task is assigned to $N^{node}$.)

The WF method is a method of assigning each task to a node by balancing the sum of the deadlines of tasks assigned to respective nodes. In other words, a new task may be assigned to a node having the lowest sum of the deadlines.

Preset option selection methods may include Highest quality First (HF), Lowest transcoding time First (LF), and Default preset First (DF).

The HF method has an object of maximizing total video quality, and thus veryslow is selected in the CPU and an HQ option is selected in the GPU.

In the LF method, ultrafast is selected in the CPU in order to minimize a total transcoding time. It was found that as a result of measurement through actual transcoding, a transcoding time difference based on a preset is meaningless in the GPU. An HQ option having the highest video quality is selected.

In the DF method, a default option in each processor is selected. The default preset option is medium in the CPU and is HQ in the GPU.

In other words, schemes compared with the method proposed in an embodiment include 6 types (RR+HF, WF+HF, RR+LF, WF+LF, RR+DF and WF+DF) including combinations of the two task assignment methods (RR and WF) and the three preset option selection methods (HF, LF, and DF).

A deadline miss ratio and a video quality per bitrate may be compared. The results of $\lambda^{trans}$ (i.e., the rate at which transcoding requests arrive) are described. Experiments of various environments may be performed while changing the rate at which transcoding requests arrive and the range of a deadline. First, experiments related to the influence of a change in the workload of the transcoding server on video quality per bitrate and a deadline miss may be performed. A load of the transcoding server is determined by $N^{node}$ and $\lambda^{trans}$. If $N^{node}$ increases or $\lambda^{trans}$ decreases, a load of the transcoding server is reduced. In this case, experiments may be performed by adjusting the value $\lambda^{trans}$ and fixing $N^{node}$ to 10. An initial value of the deadline is between 3 seconds and 20 seconds.

FIG. 3 is a graph showing video quality per bitrate according to $\lambda^{trans}$ values. Table 2 shows deadline miss ratios according to the $\lambda^{trans}$ values. Popularity combinations of resolutions affected video quality per bitrate, but did not affect deadline miss ratios.

TABLE 2

Deadline miss ratios according to $\lambda^{trans}$ values

| Scheme | $\lambda^{trans}$ | | | | |
|---|---|---|---|---|---|
| | 1 | 2 | 3 | 4 | 5 |
| Algorithm | 0 | 0 | 0 | 0 | 0 |
| RR + HF | 9989 | 86567 | 129717 | 173011 | 216060 |
| WF + HF | 5765 | 8833 | 12142 | 14847 | 17277 |
| RR + LF | 0 | 0 | 0 | 0 | 0 |
| WF + LF | 0 | 0 | 0 | 0 | 0 |
| RR + DF | 0 | 0 | 0 | 0 | 3 |
| WF − DF | 1 | 1 | 6 | 11 | 21 |
| $N^{node}$ | 86608 | 173244 | 259452 | 346040 | 432136 |

Referring to FIG. 5, it can be seen that in all of the cases, the method proposed in an embodiment has very higher video quality per bitrate than other methods. If the method proposed in an embodiment is excluded, a system having the highest video quality per bitrate is RR+HF and has video quality per bitrate, which is 4.41% lower than that of the proposed algorithm on average. In contrast, it can be seen that a system having the lowest video quality per bitrate is RR+LF and has video quality per bitrate, which is 9.428% lower than that of the proposed algorithm on average.

It can also be seen that the method proposed in an embodiment is excellent in terms of the deadline miss. In the method proposed in an embodiment, a deadline miss does not occur. However, it can be seen that a deadline miss occurs in other schemes except RR+LF and WF+LF. On average, a scheme having the greatest deadline miss is RR+HF. It can be seen that in this scheme, a task experiences a deadline miss of 11.534% when $\lambda^{trans}$ is 1 and almost half of tasks experience a deadline miss when $\lambda^{trans}$ is 2~5. It can be seen that a deadline miss for a load does not occur in RR+DF when $\lambda^{trans}$ is 1~4, but a deadline miss for a load occurs when $\lambda^{trans}$ is 5.

The results of the deadline range are described. Experiments related to the influence of the range of the deadline of a task on video quality per bitrate and a deadline miss ratio may be performed. In this case, the experiments may be performed by diversifying the range of the task and fixing $\lambda^{trans}$ to 5 and $N^{node}$ to 10. FIG. 6 is a graph showing video quality per bitrate according to $\lambda^{trans}$ values. Table 3 shows deadline miss ratios according to the $\lambda^{trans}$ values.

TABLE 3

Deadline miss ratios according to deadline range values

| Scheme | $\lambda^{trans}$ | | | | |
|---|---|---|---|---|---|
| | [3, 20] | [3, 30] | [3, 40] | [3, 50] | [3, 60] |
| Algorithm | 0 | 0 | 0 | 0 | 0 |
| RR + HF | 216060 | 216054 | 216045 | 216045 | 216045 |
| WF + HF | 17277 | 16129 | 8660 | 8660 | 8660 |
| RR + LF | 0 | 0 | 0 | 0 | 0 |
| WF + LF | 0 | 0 | 0 | 0 | 0 |
| RR + DF | 3 | 2 | 1 | 1 | 1 |
| WF − DF | 21 | 25 | 9 | 9 | 9 |
| $N^{node}$ | | | 432136 | | |

In this case, it can be seen that in all of the cases, the method proposed in an embodiment has very higher video quality per bitrate than other methods. If the method proposed in an embodiment is excluded, it can be seen that a method having the highest video quality per bitrate is RR+HF and has video quality per bitrate, which is 4.404% lower than that of the proposed algorithm on average. In contrast, it can be seen that a method having the lowest video quality per bitrate is RR+LF and has video quality per bitrate, which is 9.41% lower than that of the proposed algorithm on average.

In terms of the deadline miss ratio, the method proposed in an embodiment is excellent in all of the cases. A deadline miss did not occur in the method proposed in an embodiment and RR+LF and WF+LF, but deadline misses occurred in other schemes. It can be seen that the deadline misses of all of the schemes in which the deadline misses occurred are decreased as the deadline range is increased. It can be seen that on average, a scheme having the largest deadline miss is RR+HF and the deadline miss occurred in about half of tasks in all of deadline ranges.

Through such experiments, it can be proved that the method proposed in an embodiment is always more excellent than other schemes in that not only video quality per bitrate, but the deadline is satisfied.

The transcoding server configured with heterogeneous processors may select a transcoding preset option and transcode video based on the VBR within a deadline. Accordingly, the deadline of a transcoding task can be satisfied, and video quality per bitrate can be maximized.

The aforementioned apparatus may be implemented as a hardware component, a software component and/or a combination of them. For example, the apparatus and components described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing apparatus may perform an operating system (OS) and one or more software applications executed on the OS. Furthermore, the processing apparatus may access, store, manipulate, process and generate data in response to the execution of software. For convenience of understanding, one processing apparatus has been illustrated as being used, but a person having ordinary skill in the art may understand that the processing apparatus may include a plurality of processing elements and/or a plurality of types of processing elements. For example, the processing apparatus may include a plurality of processors or a single processor and a single controller. Furthermore, other processing configurations, such as a parallel processor, are also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software. Examples of the computer-readable storage medium include magnetic media such as a hard disk, a floppy disk and a magnetic tape, optical media such as a CD-ROM and a DVD, magneto-optical media such as a floptical disk, and hardware devices specially configured to store and execute program instructions such as a ROM, a RAM, and a flash memory. Examples of the program instructions include not only machine language code that is constructed by a compiler but also high-level language code that can be executed by a computer using an interpreter or the like.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and equivalents of the claims belong to the scope of the claims.

What is claimed is:

1. A method performed by a transcoding server configured with heterogeneous processors, the method comprising:
receiving a request for video transcoding for a video encoded based on a variable bitrate (VBR);
predicting transcoding information for assigning a transcoding task in response to the received request for video transcoding,
wherein predicting the transcoding information includes sequentially predicting a transcoding time of each resolution based on a bitrate of a highest resolution of a plurality of resolutions by applying multi-regression analysis; and
determining information on a node to which a transcoding task is to be assigned and preset option information for the transcoding based on a result of the predicted transcoding information.

2. The method of claim 1, wherein predicting the transcoding information comprises:
predicting each preset option and a bitrate and video quality of each resolution in each processor node based on the VBR of each of segments of the video with respect to original data of the video.

3. The method of claim 2, wherein predicting the transcoding information comprises deriving a relation between the resolution, the bitrate, and the video quality and a relation between the resolution and transcoding time based on the bitrate of the original data of the video by applying multi-regression analysis.

4. The method of claim 1, wherein determining the information on the node and the preset option information comprises determining a processor node, comprising any one processor type of a GPU or a CPU to which a transcoding task is to be assigned, and preset option information for the transcoding, based on each preset option included in results of the predicted transcoding information and a bitrate, video quality and the transcoding time of a resolution in each processor node.

5. The method of claim 4, wherein determining the information on the node and the preset option information comprises selecting a node and preset option indicative of a minimum transcoding time.

6. The method of claim 5, wherein determining the information on the node and the preset option information comprises redistributing a workload to a processor node determined to maximize video quality per bitrate while minimizing a transcoding increase time.

7. The method of claim 5, wherein determining the information on the node and the preset option information comprises:

obtaining a utility value when an i (i is a natural number)-th task is executed based on a specific preset in a j (j is a natural number) node, and performing the workload redistribution based on a utility value of a preset reference or more from the obtained utility value.

8. A transcoding server configured with heterogeneous processors, comprising:

a transcoding request receiver configured to receive a request for video transcoding for a video encoded based on a variable bitrate (VBR);

a transcoding information prediction unit configured to predict transcoding information for assigning a transcoding task in response to the received request for video transcoding; and a determination unit configured to determine information on a node to which a transcoding task is to be assigned and preset option information for the transcoding based on a result of the predicted transcoding information, wherein the predicted transcoding information includes a predicted transcoding time of each resolution based on a bitrate of a highest resolution of a plurality of resolutions by applying multi-regression analysis.

* * * * *